United States Patent [19]

Facco

[11] Patent Number: 4,735,394
[45] Date of Patent: Apr. 5, 1988

[54] ARRANGEMENT FOR ADJUSTING THE INCLINATION OF A KEYBOARD

[75] Inventor: Gastone Facco, Ivrea, Italy

[73] Assignee: Ing. C. Olivetti & C., S.p.A., Ivrea, Italy

[21] Appl. No.: 945,523

[22] Filed: Dec. 23, 1986

[30] Foreign Application Priority Data

Jan. 31, 1986 [IT] Italy .............................. 67080 A/86

[51] Int. Cl.$^4$ ............................................. F16M 13/00
[52] U.S. Cl. ......................................... 248/653; 108/7; 248/1 I; 248/188.8; 248/359 E; 248/371; 248/456; 248/649; 400/682; 403/93
[58] Field of Search ............... 248/653, 455, 456, 398, 248/371, 188.8, 359 E, 649, 359 C, 677, 1 B, 1 I, 1; 400/681, 682; 403/93; 108/7, 9, 6

[56] References Cited

U.S. PATENT DOCUMENTS

| 3,547,054 | 12/1970 | Caldwell ........................... 403/93 X |
| 4,516,508 | 5/1985 | Kako et al. ...................... 248/456 X |
| 4,568,056 | 2/1986 | Lewinski ............................ 248/1 B |
| 4,592,528 | 6/1986 | Still ................................... 248/359 |
| 4,693,444 | 9/1987 | Williams et al. ................... 108/7 X |

OTHER PUBLICATIONS

IBM Technical Disclosure Bulletin, vol. 25, No. 6, Nov. 1982, J. R. Thorpe.
IBM Technical Disclosure Bulletin, vol. 25, No. 6, Nov. 1982, I. Golledge.
IBM Technical Disclosure Bulletin, vol. 27, No. 1013, Mar. 1985.

Primary Examiner—J. Franklin Foss
Assistant Examiner—David L. Talbott
Attorney, Agent, or Firm—Banner, Birch, McKie & Beckett

[57] ABSTRACT

The inclination adjusting arrangement is applied to a keyboard having a base structure in which a plurality of keys is mounted. The keyboard is provided in its lower portion with fixed front support feet and rear support feet. The rear feet can project by varying amounts from the bottom of the base structure in such a way that the angle of inclination of the plane of the keys is variable with respect to the desk top. For the purposes of adjusting the degree of projection, the rear feet are pivoted and movable along their own axis by means of a slot which co-operates with a fixed pivot pin on the base structure. Each rear foot comprises a positioning tooth which is disposed opposite a support surface and which is capable of selectively engaging with a seat of a series of seats of the base structure. Resilient means which co-operate with the pin hold the positioning tooth engaged with one of the seats. The seats are disposed on a circular arc substantially coaxial with the fixed pin, in different angular positions for varying the distance of the support surfaces from the plane of the keys. The resilient means comprise a resilient blade which is bent and curved in such a way that its free end engages the fixed pin.

12 Claims, 2 Drawing Sheets

ARRANGEMENT FOR ADJUSTING THE INCLINATION OF A KEYBOARD

BACKGROUND OF THE INVENTION

The present invention relates to an arrangement for adjusting the inclination of a keyboard having a base structure in which there is mounted a plurality of keys and which is provided in its lower portion with feet by means of which it can be supported on a support surface referred to herein as a desk top, and in which the feet can project by varying amounts from the bottom of the base structure in such a way that the angle ot inclination of the plane of the keys is variable with respect to the desk top.

In an arrangement for adjusting the inclination of a keyboard, of known type, the keyboard is provided with a pair of rear feet comprising two cams mounted eccentrically on a shaft in the base structure. A gear mechanism transmits the movement as between the shaft on the base structure and a control shaft having a knurled knob at one end. The user of the arrangement, by rotating the knurled knob in a clockwise or anti-clockwise direction, by means of the control shaft and the gear mechanism, causes rotary movement of the shaft bearing the two cams and can thus vary the angle of inclination as between the plane of the keys and the support surface. That arrangement suffers from the disadvantage of being fairly expensive.

SUMMARY OF THE INVENTION

The object of the present invention is to provide an arrangement for adjusting the inclination of a keyboard, which is simple, reliable, and aesthetically acceptable and which is at the same time easy and quick to use and which finally is inexpensive.

Accordingly, the arrangement for adjusting the inclination of a keyboard, according to the invention, is characterised in the manner set out in claim 1.

BRIEF DESCRIPTION OF THE DRAWING

A preferred embodiment of the invention is set forth in the following description which is given by way of non-limiting example, with reference to the accompanying drawing in which.

DESCRIPTION OF THE PREFERRED EMBODIMENT

Figure 1:
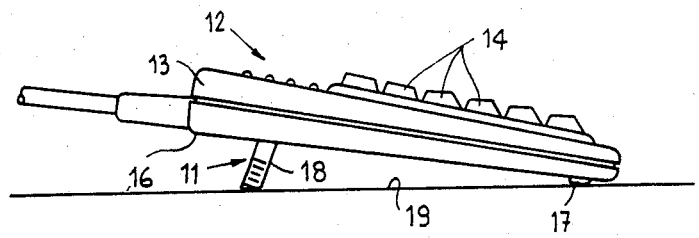
FIG. 1 is a side view of a keyboard with the inclination adjusting arrangement according to the invention, in a first operating position.

Referring to FIG. 1, the arrangement for adjusting the inclination of a keyboard is generally indicated by reference numeral 11 and is applied to a keyboard 12 having a base structure 13 of substantially parallelepipedic shape, in which a plurality of keys 14 is mounted. The base structure 13 comprises a bottom 16 provided with front fixed support legs or feet 17 and rear support legs or feet 18 which can project by variable distances from the bottom 16 in such a way that the angle of inclination of the plane of the keys 14 is variable selectively according to the preference of the operator, with respect to a support surface 19, as shown by way of non-limiting example in FIGS. 1, 2 and 3. The front support feet 17 and the rear support feet 18 can be in groups of two or more according to the dimensions of the keyboard 12. Since the invention relates only to the rear support feet 18 which are the same as each other and for the purposes of simplification of the description, only one of the rear support feet 18 will be described hereinafter, being referred to for the sake of simplicity as the foot 18.

In particular, the inclination adjusting arrangement 11 (FIG. 5) comprises the foot 18 which is pivoted and which moves axially with respect to a fixed pivot pin 21 of the base structure 13. The foot 18 is of substantially parallelepipedic shape and has a support surface 22 by means of which it is supported on the support surface 19, a positioning tooth 23 which is disposed at the opposite end to the support surface 22 and which is capable of selectively engaging a series of seats 24, 26 and 27 of the base structure 13, and a resilient blade 28 which is arranged always to be engaged with the fixed pin 21 to hold the positioning tooth 23 always in a condition of engagement with the selected seat 24, 26 or 27.

Figure 5:
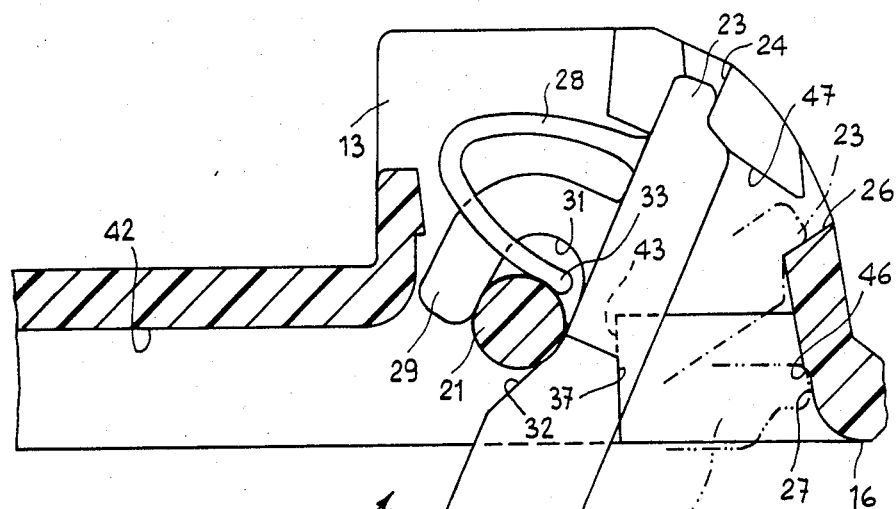
FIG. 5 is a side view in partial section of the keyboard with the arrangement as shown in FIG. 1, on an enlarged scale.

The seats 24, 26 and 27 are disposed on a circular arc which is coaxial with the fixed pin 21 but they are at various angular positions in such a way as to permit the plane of the keys 14 (FIG. 1) to be inclined with respect to the support surface 19. In FIG. 5, the positioning tooth 23 is shown in solid lines in the position of engagement with the seat 24, it is shown in dashdotted lines in the condition of engagement with the seat 26, corresponding to FIG. 2, and it is shown in double-dotted-dashed lines in a condition of engagement with the seat 27, corresponding to FIG. 3.

Figure 4:
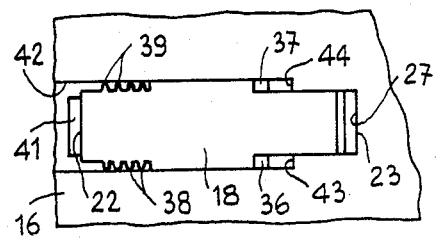
FIG. 4 is a view of part of the bottom of the structure of the keyboard with the arrangement according to the invention as shown in FIG. 3, on an enlarged scale.

The foot 18 (see FIG. 5) which is of elongate shape comprises, in an intermediate portion thereof, a hook-shaped element 29 which defines a slot 31 and an inclined surface 32 which partially delimits the slot 31. The foot 18 is pivoted and moves axially with respect to the fixed pivot pin 21 by means of the slot 31, as will be described in greater detail hereinafter. The element 29 is disposed adjacent to the resilient blade 28 which in turn is adjacent to the positioning tooth 23. The resilient blade 28 is bent and curved in such a way that the free edge 33 thereof is always engaged with the fixed pivot pin 21. The foot 18 also comprises, on mutually oppositely disposed side surfaces thereof, two shoulders 36 (see FIG. 4) and 37 which are disposed adjacent to the rigid element 29 (see FIG. 5), two series of ribs 38 (see FIG. 4) and 39 which are disposed adjacent to and at the sides of the support surface 22, and a projecting edge 41 which is disposed on the continuation of the support surface 22. The foot 18 is of plastics material and is produced in one piece with the support surface 22 (see FIG. 5), the positioning tooth 23, the resilient blade 28, the element 29, the shoulders 36 (FIG. 4) and 37, the series of ribs 38 and 39 and the projecting edge 41.

The bottom 16 of the keyboard 12 comprises a housing 42 for accommodating the part of the foot 18 opposite to the surface 22, and two fixed abutments 43 and 44 which are co-operable with the shoulders 36 and 37, as described hereinafter. The seats 24 (see FIG. 5), 26 and 27 are provided in the base structure 13. The seats 27 and 26 comprise an inclined surface 46 and 47 respectively for assisting with the movement of the positioning tooth 23 from a position of minimum inclination in which the tooth 23 is engaged with the seat 27, as shown in FIG. 3, to a second intermediate position inn which the positioning tooth 23 is engaged with the seat 26, as shown in FIG. 2, to a third position of maximum inclination in which the positioning tooth 23 is engaged with the set 24, as shown in FIG. 1, as described hereinafter.

Figure 2:
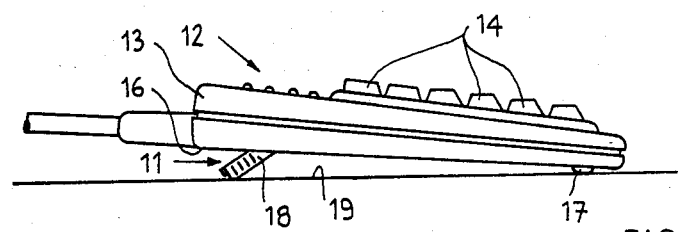
FIG. 2 is a side view of the keyboard with the arrangement shown in FIG. 1, in a second operating position.
Figure 3:
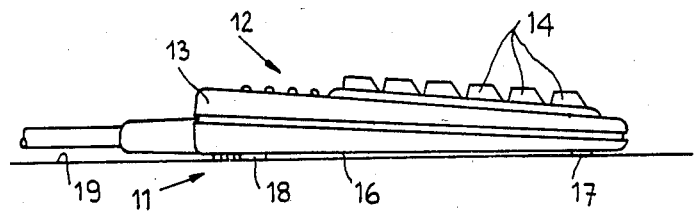
FIG. 3 is a side view of the keyboard with the arrangement of FIG. 1, in a third operating position.

The mode of operation of the inclination adjusting arrangement 11 is as follows:

It will be assumed that the foot 18 is in the first position in which the positioning tooth 23 is engaged with the seat 27, corresponding to FIG. 3, and the keyboard is set at the position of minimum inclination. Using a finger, the operator applies a force to the projecting edge 41 and causes the foot 18 to begin to rotate in an anticlockwise direction about the fixed pin 21. Due to the force of the resilient blade 28, the positioning tooth 23 engages and slides over the inclined surface 46 and the foot 18 rotates easily with a low manual pressure which loads the blade 28 until the positioning tooth 23 is aligned with the seat 26. At that point, the resilient blade 28, by virtue of the stress thereof, urges the tooth 23 upwardly and causes it to engage and holds it in an engaged condition with the seat 26. The foot 18 is now in its second position corresponding to that shown in FIG. 2. If the angle of inclination of the plane of the keys 14 with respect to the support surface 19 is still not sufficient, the operator, still by means of the projecting edge 41, causes the foot 18 to rotate further in the anticlockwise direction about the fixed pin 21, again loading the blade 28. The positioning tooth 23 engages and slides over the inclined surface 47 while the foot 18 continues to rotate easily with a low manual pressure. When the positioning tooth 23 is in a position of alignment with the seat 24, the stress of the resilient blade 28 causes the tooth 23 to be urged upwardly and causes it to engage with the seat 24 and holds it in the engaged condition therein. The foot 18 will then be in the third position thereof, corresponding to the position shown in FIG. 1. In that position, the shoulders 36 (FIG. 4) and 37 engage and are blocked against the fixed abutments 43 and 44 which act as travel-limiting elements. If the operator should try accidentally to continue the rotary movement in the anticlockwise direction, such movement would be prevented insofar as the foot 18 is locked with the positioning tooth 23 housed in the seat 24 and with the shoulders 36 and 37 in a condition of abutting against the fixed abutments 43 and 44. That eliminates the possibility of parts of the arrangement being broken.

Each of the three positions shown in FIGS. 1, 2 and 3 is stable insofar as the force of the resilient blade 28 is such as to hold the positioning tooth 23 always in a condition of engagement with the respective seat 27, 26 and 24. Any force applied to the keyboard 12 in a direction towards the surface 19 only causes the condition of engagement as between the tooth 23 and the seats 27, 26 and 24 to be maintained.

Figure 6:
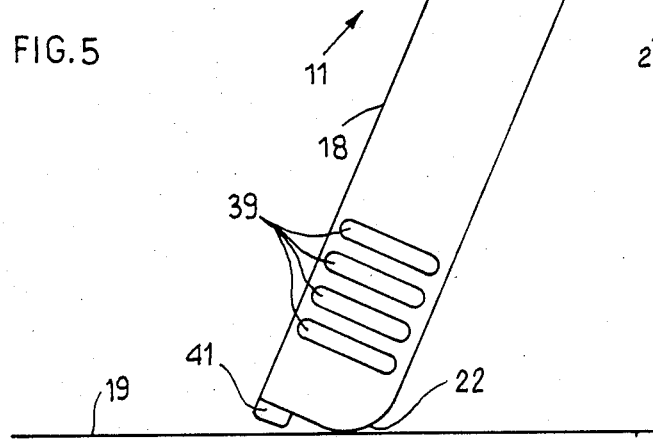
FIG. 6 is a partial section of details of the arrangement shown in FIG. 5, in an operating position.
Figure 6:
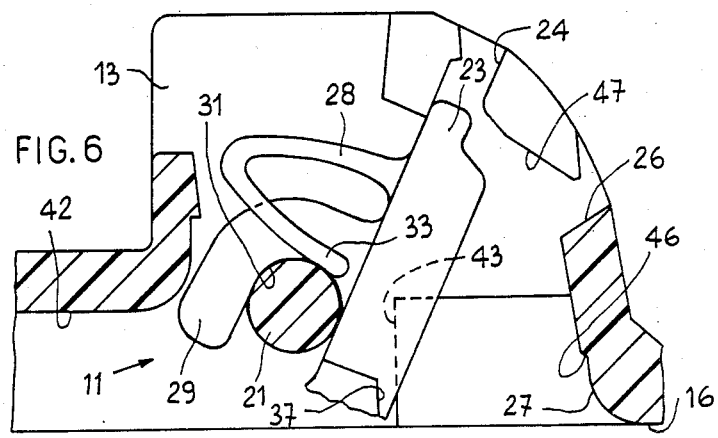

If the operator is to move the foot 18 from the third position shown in FIG. 1 to the second position shown in FIG. 2 or from the second position to the first position shown in FIG. 3, the user operates the arrangement in the following manner:

Using two fingers, the operator grips the ribs 38 (see FIG. 4) and 39 and then pulls the foot 18 along the axis thereof outwardly of the base structure 13, causing the slot 31 to slide on the fixed pin 21 against the force of the resilient blade 28. When the closed end of the slot 31 (see FIG. 6) is in a position of being blocked against the fixed pin 21, the positioning tooth 23 is already disengaged from the seat 24 or the seat 26. The operator then rotates the foot 18 in a clockwise direction until the positioning tooth 23 is in alignment with the second seat 26 or with the first seat 27. As soon as the operator ceases to pull on the foot 18, the resilient blade 28 causes the positioning tooth 23 immediately to come into engagement with the second seat 26 or the first seat 27.

As shown in FIG. 5, the foot 18 is mounted to the base structure 13 in a very easy and simple fashion. Indeed, it is only necessary to position the foot 18 in a slightly inclined position against the bottom of the housing 42, with the slot 31 in line with the fixed pin 21. By applying a slight manual pressure to the outside edge of the positioning tooth 23, the foot 18 is moved towards the rearward part of the bottom 16 (towards the left in FIG. 5), the element 29 bends slightly, permitting the fixed pin 21 to be received in the slot 31, and the free edge 33 of the resilient blade 28 engages the fixed pin 21 and causes the foot 18 to assume its first position, that is to say, the position shown in doubled-dotted-dash line as shown in FIG. 3.

It will be apparent therefore that the force of the resilient blade 28 holds the foot 18 in a stably engaged condition, with the positioning tooth 23 engaged with the respective seat 24, 26 and 27. In addition, a straightforward manual pressure is sufficient to overcome the force of the resilient blade 28 and to vary the angle of inclination of the plane of the keys 14.

It will be appreciated that the inclination adjusting arrangement 11 as described hereinbefore may be the subject of various modifications and various addition of parts, without departing from the scope of the present invention. In particular, in place of the two series of ribs 38 and 39 on the foot 18, it is possible to provide two circular seats or recessed rings in the foot 18, for example to make it easier for the operator to grip the foot 18 manually. In addition the three seats 24, 26 and 27 are not limitative as described hereinbefore, and there may be a larger number thereof, thereby limiting the magnitude of the angular movement from one seat to another, thus providing a wider range of options in regard to varying the angles of inclination of the plane of the keys 14 with respect to the support surface 19.

What I claim is:

1. An arrangement for adjusting the inclination of a keyboard having a base structure in which a plurality of keys is mounted and having a bottom portion; adjustable support feet which can project variable amounts from said bottom portion to vary the inclination of the plane of the keys with respect to a support surface for the keyboard, wherein the adjustable support feet are movable from a first position of minimum inclination to a second position of intermediate inclination and to a third position of maximum inclination of the keyboard and vice-versa; and the combination comprising:

said base structure comprises for each adjustable support foot a housing for housing in part the respective adjustable support foot when it is in the first position; a fixed pivot pin; three fixed seats which are disposed on a circular arc of the base structure coaxially with the fixed pivot pin and at various angular positions; and two fixed abutments disposed adjacent to the fixed pivot pin;

each adjustable support foot is embodied in one piece and comprises a support surface, by means of which it is supported on the support surface for the keyboard; a hook-shaped element which projects from the foot and defines a slot for housing the fixed pivot pin and for causing the foot to pivot and to move axially with respect to said fixed pivot pin; an inclined surface which partially delimits said slot; a positioning tooth which is disposed opposite to said support surface and is capable of selectively engaging a seat of said three fixed seats; two shoulders for cooperating with the two fixed abutments; and a resilient blade which projects from the foot, is disposed adjacent to the hook-shaped element and comprises an opertive portion adjacent to said slot;

wherein said inclined surface delimits the axial movement of the foot when the positioning tooth is housed in the selected seat; and wherein said resilient blade is curved and bent in such a way that its operative portion is always engaged with said fixed pivot pin to hold the positioning tooth in condition of engagement with the selected seat of said three fixed seats.

2. An arrangement according to claim 1, wherein each adjustable support foot is of substantially parallelepipedic shape and comprises two opposite sides of smaller size and a side larger size, wherein a side of smaller size is provided with the support surface and the opposite side is provided with the positioning tooth, wherein the side of larger size is provided with the hook-shaped element and with the resilient blade, and wherein said hook-shaped element and said resilient blade are positioned adjacent to said positioning tooth.

3. An arrangement according to claim 2, wherein the two shoulders of each adjustable support foot are disposed on mutually oppositely disposed side surfaces adjacent to said hook-shaped element; and wherein each foot further comprises two series of ribs which are disposed adjacent to and at the sides of the support surface, and a projecting edge which is disposed on the continuation of the support surface and allows gripping thereof to facilitate positioning of the respective adjustable support foot in one of said three seats.

4. An arrangement according to claim 1, wherein the first seat of said three fixed seats is disposed adjacent to the bottom portion of said bse structure and said first seat corresponds to the first position of the adjustable support foot, the second seat corresponds to the second position of the adjustable support foot, and the third seat corresponds to the third position of the adjustable support foot, wherein the first seat and the second seat comprise each an inclined surface for assisting with the movement of the positioning tooth from the first position to the second position and successively from the second position to the third position, and wherein when the adjustable support foot is in the third position the two shoulders cooperate with the two fixed abutments to prevent possible breaking as between the parts of the arrangement if the adjustable support foot were to be forced beyond the third position.

5. An arrangement according to claim 4, wherein when the adjustable feet in the third position or in the second position, to be positioned in the second position or the first position, the adjustable feet must be gripped on the ribs, must be pulled axially outwardly of the base structure against the force of the resilient blade and must then be turned about the fixed pin to position the positioning tooth in the second seat or in the first seat and then finally released, whereupon the resilient blade causes the positioning tooth rapidly to engage with the second seat or with the first seat.

6. An arrangement according to claim 1, wherein for mounting the foot to the base structure, the foot is disposed in a position of being slightly inclined against the bottom of the housing with the slot aligned with the fixed pin, a pressing force is applied to the outside edge of the positioning tooth, urging the foot towards the rear part of the base structure so as slightly to bend the element which defines the slot, permitting the fixed pin to be housed in the slot and permitting the free edge of the resilient blade to engage the fixed pin, thereby to cause the foot to occupy its first position.

7. An arrangement for adjusting the inclination of a keyboard having a base structure in which a plurality of keys is mounted and which is provided in its lower portion with adjustable support feet which can project by variable amounts from the bottom of the base structure to vary the inclination of the plane of the keys with respect to a desk top from a rest position to a plurality of opertive positions; wherein the base structure comprises a fixed pivot pin and a series of seats disposed at different angular positions with respect to said fixed pivot pin; wherein each adjustable foot is guided in a housing and pivoted and movable with respect to the fixed pivot pin of the base structure; and wherein each adjustable foot comprises a support surface, a positioning tooth which is disposed opposite to said support surface and which is capable of selectively engaging a seat of said series of seats of the base structure for permitting variable angles of inclination of the plane of the keys with respect to the desk top, and resilient means for urging the positioning tooth to stay engaged with a seat of the series of seats and enabling easy assembly of the foot on said base structure; said resilient means comprising:

a hook element of the foot, which delimits a slot for cooperating with said fixed pin, wherein said slot includes an entering section and is configured to cause the foot to pivot and to move axially with respect to said fixed pin;

a resilient blade disposed adjacent to said hook element and having an operative portion adjacent to said slot to engage with the fixed pin when the foot is assembled with said base portion; and an inclined surface at the entering section of said slot ot limit the axial movement of said foot along said slot;

wherein each foot is of plastic material in one piece with said support surface, said positioning tooth, said resilient blade, and said hook element; and wherein said inclined surface is configured to enable housing of said pivot pin in said slot upon putting the entering section of said slot aligned with said fixed pin and urging the foot so as slightly to bend the hook element upon the housing of said pin beyond said entering section and engagement of said pin with the operative portion of said resilient blade.

8. An arrangement according to claim 7, wherein the series of seats comprises two seats capable of being selectively engaged by the positioning tooth to define two positions of inclination of the plane of the keys with respect to the desk top, wherein said two seats include an intermediate seat and an end seat corresponding to a position of intermediate inclination and a position of maximum inclination of the plane of the keys with respect to the desk top; wherein the intermediate seat includes an inclined surface for assisting with the positioning of the positioning tooth from an intermediate position corresponding to engagement with said intermediate seat to an end position corresponding to engagement with said end seat; wherein said end seat is delimited by a sharp surface avoiding back positioning of said tooth to said intermediate seat; and wherein said slot defines a path for said tooth which enables said tooth to release the sharp surface of said end seat under a pulling action on said tooth against the action of said resilient blade.

9. An arrangement according to claim 8 wherein the base structure comprises two fixed abutments co-operable with two shoulders of the respective foot when the foot is in the end position to prevent possible breaking as between the parts of the arrangement if the foot were to be forced beyond said end position.

10. An arrangement according to claim 8, wherein the base structure comprises two housings for accommodating two respective feet and wherein each foot is adjustable and has a projecting edge adjacent to said support surface to permit gripping thereof to facilitate positioning of the foot in one of said two seats.

11. An arrangement for adjusting the inclination of a keyboard having a base structure in which a plurality of keys is mounted and which is provided in its lower portion with adjustable support feet which can project by variable amounts from the bottom of the base structure to vary the inclination of the plane of the keys with respect to a desk top from a rest position to a plurality of operative positions; wherein the base structure comprises a fixed pivot pin and a series of seats disposed at different angular positions with respect to said fixed pivot pin; wherein each adjustable foot is guided in a housing and pivoted and movable with respect to the fixed pivot pin of the base structure; and wherein each adjustable foot comprises a support surface, a positioning tooth which is disposed opposite to the support surface and which is capable of selectively engaging a seat of said series of seat of the base structure permitting variable angles of inclination of the plane of the keys with respect to the desk top, and resilient means for urging the positioning tooth to stay engaged with a seat of said series of seats and performing unidirectional motion of each foot toward increasing inclinations of the keyboard with respect to the desk top; said resilient means comprising:

means for defining a slot on said foot, wherein said slot causes the foot to pivot and to move axially with respect to said fixed pin, wherein said series of seats comprises two seats capable of being selectively engaged with the positioning tooth the define two positions of inclination of the plane of the keys with respect to the desk top, wherein said two seats include an intermediate inclination and a position of maximum inclination of the plane of the keys with respect to the desk top;

a resilient blade disposed adjacent to said slot and having an active portion adapted to stay always engaged with the fixed pin; and an inclined surface adjacent to said intermediate seat for assisting with positioning of the positioning tooth from an intermediate position corresponding to engagement with said intermediate seat to an end positioning corresponding to engagement with said end seat;

wherein said end seat is delimited by a sharp surface avoiding back positioning of said tooth to said intermediate seat; and wherein said slot defines a path for said tooth which enables said tooth to release the sharp surface of said end seat under a pulling action on said tooth against the action of said resilient blade.

12. An arrangement according to claim 11 wherein the base structure comprises two fixed abutments co-operable with two shoulders of respective foot when the foot is in the end position to prevent possible breaking as between the parts of the arrangement if the foot were to be forced beyond the end position.

* * * * *